April 9, 1968 P. H. MORGANSON 3,376,787
GUIDE ATTACHMENT
Filed July 14, 1966
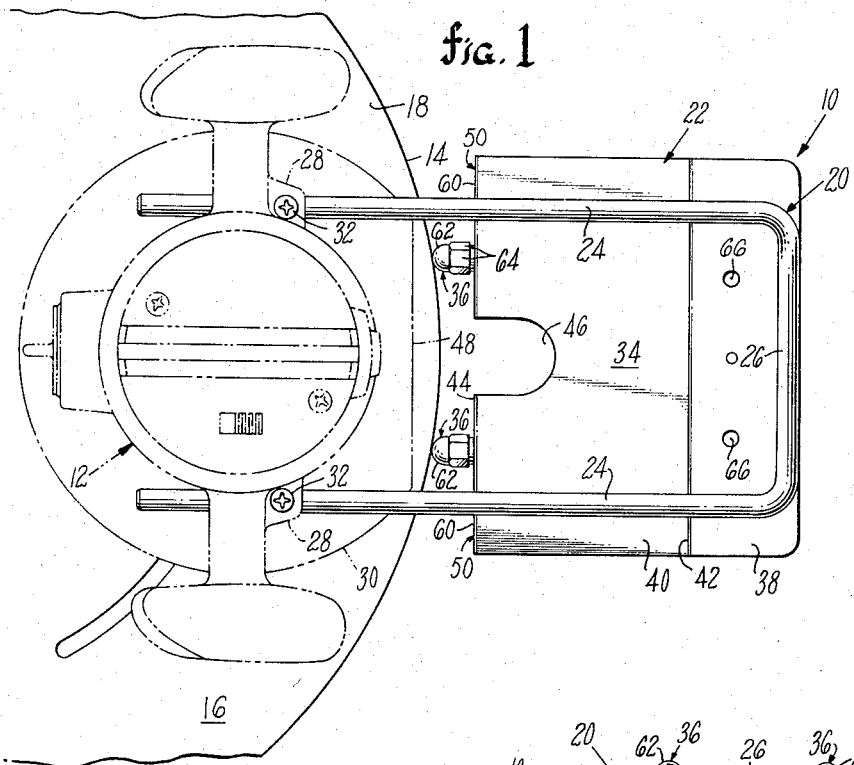
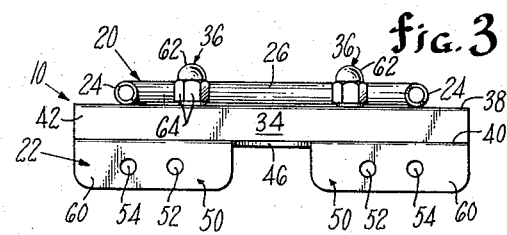
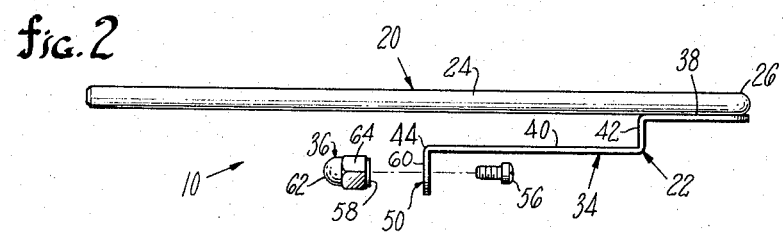
INVENTOR.
PETER H. MORGANSON
BY
Lindsey, Prutzman and Hayes
ATTORNEYS United States Patent Office 3,376,787
Patented Apr. 9, 1968

3,376,787
GUIDE ATTACHMENT
Peter H. Morganson, Winsted, Conn., assignor to The Stanley Works, New Britain, Conn., a corporation of Connecticut
Filed July 14, 1966, Ser. No. 565,299
2 Claims. (Cl. 90—12)

ABSTRACT OF THE DISCLOSURE

A guide attachment for a router comprising a U-shaped rod with leg portions adapted to be adjustably mounted in openings in a router frame, a stair-step shaped plate having an outer flat portion secured to the outer end of the U-shaped rod and an inner depending edge with laterally spaced coplanar portions engageable with a workpiece for guiding the router therealong and having laterally spaced openings in which nut and screw fasteners may be mounted to provide for guiding the router along an irregular or curved workpiece edge. The outer flat portion of the guide plate is also provided with openings for storing the fasteners when the spaced coplanar edge portions are used to guide the router.

---

The present invention relates generally to guides for routers and the like. More particularly it is directed to a new and improved guide attachment of the type described adapted for use with workpieces having either straight or arcuate guide-contacting surfaces.

It is an object of the present invention to provide a new and improved guide attachment for a router or the like which is simple in design and precise in operation while at the same time possessing the capability of rapid and facile conversion for use with either straight or curved guide-contacting surfaces.

Another object of the present invention is to provide a new and improved guide attachment for a router or the like which can be rapidly manufactured in an economical manner yet is of durable and sturdy construction enabling firm and accurate control over the travel of the router along the workpiece.

An additional object is to provide a new and improved guide for a router which is not only ideally suited for use with straightedged workpieces but which also facilitates stabilized operation and true conformity with edges of both convex and concave workpieces without interference from other portions of the guide.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIG. 1 is a top view of the guide attachment of the present invention illustrating its use in conjunction with a workpiece having an arcuate guide-contacting surface;

FIG. 2 is a side view of the guide attachment having a portion thereof exploded; and FIG. 3 is a front view of the guide attachment of FIG. 2 adapted for use with a workpiece having a flat guiding surface.

Referring now to the drawing in greater detail, wherein like referenced characters indicate like parts throughout the several figures, there is shown in FIG. 1 a guide attachment, generally designated 10, mounted on the router 12, shown in phantom. The router 12 is of the type which readily mounts a dual rod guide, for example, the router disclosed in the copending U.S. patent application of Milford D. Burrows et al., Ser. No. 545,151, entitled "Router." As illustrated, the mounted guide 10 is positioned against the arcuate side 14 of the workpiece 16 for guiding the router 12 over the flat top surfaces 18 of the workpiece at a uniform spaced distance from the arcuate edge. The guide 10 is comprised of a solid U-shaped mounting rod 20 attached to the router 12 and supporting the depending guide assembly, generally designated 22. The mounting rod 20 consists of a pair of elongated arm portions 24 and a substantially straight connecting portion 26 integral at each end with one of the arm portions 24 and of shorter length than the width of the guide 10. As illustrated, the arm portions 24 extend in the same direction in parallel side-by-side relationship from and at substantially right angles to the connecting portion 26. The elongated arm portions 24 are of greater length than the connecting portion 26 and their free ends are slideably received by the supporting lugs 28 of the router 12 located adjacent and slightly above the base 30 of the router. The arm portions extend through and beyond the lugs 28 and, after proper positioning, may be secured therein by the set screws 32.

Fixedly secured to the rod 20 at the connecting portion end thereof is the guide assembly 22 comprising a generally rectangular sheet metal guide member 34 and a pair of dome-tipped bosses 36 depending therefrom. The guide member 34 is of sufficient width to extend outwardly of the arm portions 24 and exhibits a generally stepped cross-sectional configuration (FIG. 2) whereby there is provided as the uppermost step thereof a flat, generally rectangular base portion 38 fixedly secured to both the arm and connecting portions of the mounting rod 20. The base portion 38 is integral with an offset central body portion 40 through the connecting upright 42 disposed at substantially right angles to both the base and central portions. The connecting upright 42 is of sufficient width so that the central body portion 40 will be positioned within a plane disposed below the bottom face of the router base 30 upon mounting the arm portions 24 of the rod 20 by the lugs 28 of the router 12. At the midpoint of the front or leading edge 44 of the central portion 40 opposite the connecting upright 42 there is provided a bifurcating slot 46 which extends rearwardly into the central body portion 40 in the direction of the upright. The slot 46 is of a sufficient width to permit the passage therein of a router bit or cutter (not shown), full inward movement of the guide attachment being facilitated by a flat front edge 48 on the router base 30.

Integral with the central body portion 40 along the bifurcated edge 44 is a pair of flat workpiece contacting tabs 50 (FIGS. 2 and 3) extending downwardly from the central body portion at approximately a right angle thereto. The guide tabs 50 are each provided with a pair of laterally spaced apertures 52, 54 for mounting the removable bosses 36 when it is desired to utilize the attachment as a circular guide. As will be appreciated, the inwardmost apertures 52 are employed with curved convex surfaces having a small effective radius, such as 2 to 4 inches, while the outermost boss mounting apertures 54 provide greater stability of operation with the more gradually curved convex and concave surfaces. It will, of course, be appreciated that the latter position of the bosses 36 might also be employed with straight workpieces, although such is not preferred.

As illustrated in FIG. 2, the bosses 36 may be mounted by means of the fasteners 56 which extend through the tab apertures and are received within the internally threaded flat ends 58 of the bosses which abut the flat front faces 60 of the tabs 50. The bosses 36 are mounted in substantial parallelism with the arm portions 24 of the attaching rod 20 so that upon attachment of the guide, the dome-shaped free ends 62 thereof generally face the router. The central or intermediate portions of the bosses 36 are provided with a plurality of flat faces 64 angularly disposed to produce an effect similar to a hex nut thereby aiding in assembling the bosses 36 on the tabs 50.

As shown in FIG. 3, the guide 10 may be quickly converted for use with straightedged workpiece by removing the bosses 36 from the tabs 50 and storably mounting them on the flat base portion 38 of the guide member 34 until such time as they are again needed. This conversion is rapidly and easily accomplished by loosening the connecting fasteners 56 and securing the bosses on the base portion 38 by passing the fasteners 56 through the apertures 66 (FIG. 1) located in the base portion 38 and threadably securing the bosses 36 thereto. Thereupon the flat front faces 60 of the tabs 50 will contact the straight edge of the workpiece and provide a precise and steady guide for the router.

As will be apparent from the foregoing detailed description, the present invention provides a readily convertible, easily operated guide attachment which enables accurate and steady control over both straight and circular cuts. When used with arcuate-edged workpieces the guide is quickly adjustable to provide precise and constantly stable cutting action with different and varying curvatures. Further, the bosses which provide dual-point contact during arcuate cutting operations can also be used for straight work or can be quickly, conveniently and easily stored to permit use of the preferred flat tab guides.

As will be apparent to persons skilled in the art, various modifications and adaptations of the structure above-described will become readily apparent without departure from the spirit and scope of the invention, the scope of which is defined in the appended claims.

I claim:

1. A combined straight and circular guide for a router having a flat base adapted to rest on a surface of a workpiece comprising a guide support attachable to the router and a pair of spaced bosses mounted by and offset from the support for contacting an arcuate surface of a workpiece, said bosses being disposed below the plane of the router base and generally facing the router upon attachment of the support thereto, the bosses being of sufficient length to prevent contact of the workpiece by the remainder of the guide during the operation of the router; the guide further comprising a straight guide member affixed to the support and adapted for mounting the bosses, said guide member having an elongated flat surface for contacting a straight surface of a workpiece; the guide support comprising a U-shaped rod having a pair of elongated arm portions and a connecting portion integral therewith, said arm portions being attachable to the router and said connecting portion supporting the straight guide member.

2. The guide of claim 1 wherein the U-shaped rod is disposed within a single plane, and the guide member is fixedly secured to the rod along and adjacent the connecting portion thereof, said guide member comprising a flat central body portion generally parallel to and spaced below the plane of the rod a distance greater than the thickness of the router base, the elongated workpiece contacting surface of the guide member being integral with the central body portion and disposed substantially perpendicular thereto, said elongated surface being provided with a plurality of apertures for mounting the bosses.

References Cited

UNITED STATES PATENTS 2,943,655   7/1960   Pedersen et al. _____ 144—134.5

LEONIDAS VLACHOS, *Primary Examiner.*